US009813558B1

(12) United States Patent
Brula et al.

(10) Patent No.: US 9,813,558 B1
(45) Date of Patent: Nov. 7, 2017

(54) SYSTEMS AND METHODS RELATING TO CALLER-CENTRIC CALL DATA

(71) Applicant: United Services Automobile Association (USAA), San Antonio, TX (US)

(72) Inventors: Stephen Brula, San Antonio, TX (US); Marti Bocanegra, Schertz-Cibolo, TX (US); Sarah Andreas, Helotes, TX (US); Taylor Clingan, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 35 days.

(21) Appl. No.: 14/684,897

(22) Filed: Apr. 13, 2015

Related U.S. Application Data (60) Provisional application No. 61/978,432, filed on Apr. 11, 2014.

(51) Int. Cl.
  *H04M 3/00* (2006.01)
  *H04M 3/523* (2006.01)
  *H04M 15/00* (2006.01)

(52) U.S. Cl.
  CPC ......... *H04M 3/5233* (2013.01); *H04M 15/41* (2013.01)

(58) Field of Classification Search
  CPC ............. H04M 3/5233; H04M 3/5235; H04M 3/5232; H04M 3/5183; H04M 3/5175; H04M 3/523
  USPC ............. 379/265.01–265.02, 265.12–265.13, 379/266.01–266.02
  See application file for complete search history.

(56) References Cited

U.S. PATENT DOCUMENTS

| 2008/0095355 A1* | 4/2008 | Mahalaha | H04M 3/5233 379/265.09 |
| 2011/0206198 A1* | 8/2011 | Freedman | G06Q 30/06 379/265.03 |

* cited by examiner

*Primary Examiner* — Rasha Al Aubaidi
(74) *Attorney, Agent, or Firm* — Baker Hostetler LLP (57) ABSTRACT

Systems and methods described herein may describe how enterprise system devices (e.g., servers) may be used to consolidate multiple disparate data sources (e.g., databases) into a single data source (i.e., "Datamart"). The Datamart may be a database or cluster of aggregated data from disparate data sources, which the Datamart may convert into a compatible format using various application programmable interfaces (APIs). In some cases, a software product may query the Datamart and then generate reports for understanding the data pulled from disparate sources. The reporting software application may enable enhanced analytics by humans or additional software applications, to build a more sophisticated understand around a member's call experience, reasons for call transfers, effectiveness of sales by a member service representative (MSR), and how to better train or equip MSRs to optimize their efforts.

19 Claims, 3 Drawing Sheets

SYSTEMS AND METHODS RELATING TO CALLER-CENTRIC CALL DATA

CROSS-REFERENCE TO RELATED APPLICATIONS

This non-provisional patent application claims priority to U.S. Provisional Patent Application Ser. No. 61/978,432, entitled "Systems and Methods Relating to Caller-Centric Call Data," filed Apr. 11, 2014, which is incorporated herein in its entirety.

TECHNICAL FIELD

This application describes systems and methods generally related to service desk call centers.

BACKGROUND

It is desirable to gain a better understanding of call data from a member's perspective. Conventionally, call center technology and marketing technology provide minimal insight as to why individuals call and what is accomplished during a call. In the past, contact center data was focused on the system and the representative metrics. While this information is useful for operational management and call routing, it did not provide the capability to understand and enhance the customer's experience, from the customer's perspective.

In addition, the data necessary for understanding the complete call experience often exists in several disparate and complex data sources, with very limited capability to integrate the data, in an ad hoc basis, for quick insight. For example, answering a simple question such as how often one contact center transferred calls to another contact center, including the reason and outcome, is often daunting and requires significant manual searching efforts. Automated systems to compile and analyze such disparate data is needed to understand questions, such as reasons that representatives in one call center refer potential product sales to other contact centers. Conventional call center technology does not generate or aggregate the data into perspective-based data clusters. So often there is no data solution available to easily answer knowledge-driven questions requiring data to be generated and analyzed based on perspective.

As explained above, there is presently an industry and business need for technology capable of customer-centric data gathering and responsiveness, but there are no known technologies providing a ready solution. There is also a need for real-time collection, analysis, and utilization of user-related information to satisfy a member's needs, in a system that communicates data with members and software applications through multiple channels and comprises disparate types of data.

SUMMARY

Disclosed herein are systems and methods for developing data records for member calls, from the perspective of any number of parties, such as the member's perspective or an organization's call center perspective. This type of data may not be readily available from the phone system logs or other data sources, and so must be derived using specially-programmed automated computing services. Call data from a member-centric perspective may allow the organization or computing components of the organization to automatically identify and adapt to issues that were previously unidentifiable using conventional technologies. Member-centric data, for example, may help derive an understanding and knowledge of members, such as reasons that member called and identifying what occurs during the call. Systems and methods described herein may describe how enterprise system devices (e.g., servers) may be used to consolidate multiple disparate data sources (e.g., databases) into a single data source (i.e., "Datamart"). The Datamart may be a database or cluster of aggregated data from disparate data sources, which the Datamart may convert into a compatible format using various application programmable interfaces (APIs). In some cases, a software product may query the Datamart and then generate reports for understanding the data pulled from disparate sources. The reporting software application may enable enhanced analytics by humans or additional software applications, to build a more sophisticated understand around a member's call experience, reasons for call transfers, effectiveness of sales by a member service representative (MSR), and how to better train or equip MSRs to optimize their efforts.

In one embodiment, a computer-implemented method comprises determining, by a computer, a request associated with a member call; identifying, by the computer, at least one representative associated with the request; calculating, by the computer, a performance score for each of the at least one representative associated with the request, each performance score based upon timing data and routing data for one or more call paths associated with the representative; and routing, by the computer, the member call to a terminal of the representative associated with the request having the performance score satisfying a threshold value.

In another embodiment, a computer-implemented method comprises receiving, by the computer, call data associated with a member call from one or more data sources; generating, by the computer, a call path record in response to identifying one or more call path indicators in the call data associated with the member call; generating, by the computer, one or more call segment records for one or more corresponding call segments occurring in the member call, in response to identifying one or more call segment indicators in the call data; determining, by the computer, a performance score for a representative associated with a call segment record; and transmitting, by the computer, the performance score to a directory database instructing a routing computing to route member calls based to one or more representatives based on one or more performance scores of the respective representatives.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The present disclosure is herein described in detail with reference to embodiments illustrated in the drawings, which form a part of this application. However, it should be appreciated that changes may be made to the embodiments described herein and additional or alternative embodiments may be implemented or used, without departing from the spirit or scope of the present disclosure. The illustrative embodiments described in the Detailed Description are not meant to be limiting of the subject matter described.

Reference will now be made to the exemplary embodiments illustrated in the drawings, and specific language will be used to describe the same. It will nevertheless be understood that no limitation of the scope of the invention is intended. Alterations and further modifications of the inventive features illustrated herein, and additional applications of the principles of the inventions as illustrated herein, which would occur to one skilled in the relevant art and having possession of this disclosure, are to be considered within the scope of the subject matter described.

In order to enable a better understanding of call data from a member-centric perspective, to include identifying reasons that members call and identifying what occurs during the call, the enterprise system devices (e.g., servers) may be used to consolidate multiple disparate data sources (e.g., databases) into a single data source (i.e., "Datamart"). The Datamart may be a database or cluster of aggregated data from disparate data sources, which the Datamart may convert into a compatible format using various application programmable interfaces (APIs). In some cases, a software product may query the Datamart and then generate reports for understanding the data pulled from disparate sources. The reporting software application may enable enhanced analytics by humans or additional software applications, to build a more sophisticated understand around a member's call experience, reasons for call transfers, effectiveness of sales by a member service representative (MSR), and how to better train or equip MSRs to optimize their efforts.

Described herein are systems methods of a call system that generates and stores member-centric call data, and then deploys that data within a marketing and sales analytical environment. These embodiments may allow call system to collect and integrate data from several disparate data sources, and then provide the capability to understand members' calls from the members' perspective. This new data source (i.e., "Datamart") may enable analytical capabilities that are often unavailable or not possible with conventional call center technologies, as such, the systems and methods described herein have enable further solutions that were previously not possible.

In some embodiments, a Datamart may have two database tables: one that contains data on each individual MSR conversation (i.e., call segments), and another that links these individual conversations into a call path (i.e., member call). These sources are linked back to transaction logging data from the disparate data sources, to provide easy insight into the activity occurring within each call. The Datamart may fetch or receive data from any number of additional supplemental data sources, to include transfer details data, cross-selling details, and operational details.

Software applications may use APIs to fetch, query, and analyze data from the Datamart. The software applications may further generate reports and metrics based on the algorithms executed to analyze the queried data. Some applications may provide enterprise users, such as member service representatives (MSRs) or marketing staff, with self-service reports and dashboards, to quickly query the Datamart. Such self-service applications may generate reports that provide easy access to member call metrics, such as call path volumes (i.e., number of member calls), call path durations (i.e., length of member calls), transfer activity between points of contact (e.g., MSRs, MSR units, services centers), call sources, and sales activity. Some of the report-generating software applications have been tailored to meet the needs of several different business areas, to include senior executive management, process engineering, channel management, contact center supervisors, and enterprise sales management. Each report has been built with multiple dimensions that enterprise users (e.g., administrators, MSRs) can use to query and parse the data to generate various metrics and reports.

In some embodiments, the data generated from the Datamart may be dynamically fetched and applied to other systems. For example, the call segment data may be used to identify which MSRs should receive certain types of member calls, based on metrics generated from the Datamart. This data could be fed back to the call center routing and distribution software, which then updates the call routing rules. In the future, member calls could be routed differently, based on these revised rules. Non-limiting examples of how the Datamart data may dynamically update the rules for routing member call may include: determining the efficiency or effectiveness of MSRs and then revising the routing rules according to the criteria of efficiency/effectiveness; or dynamic and predictive call routing based on likelihood scores calculated for predicted call motivators. So, in the latter example, the Datamart may cross-reference the member's activities on other channels (e.g., online history at the website) against call path data, to determine the likelihood that the member is calling about one or more particular products or services. The Datamart may produce data used by the routing software of the telephony system to revise the routing rules based on the predicted likelihood that a member is calling about a predicted set of products or services. These are intended as non-limiting examples. There are any number of additional examples for applying the data related to the call path datasets and call segment datasets, stored in the Datamart.

Components of an Exemplary Call System

Figure 1:
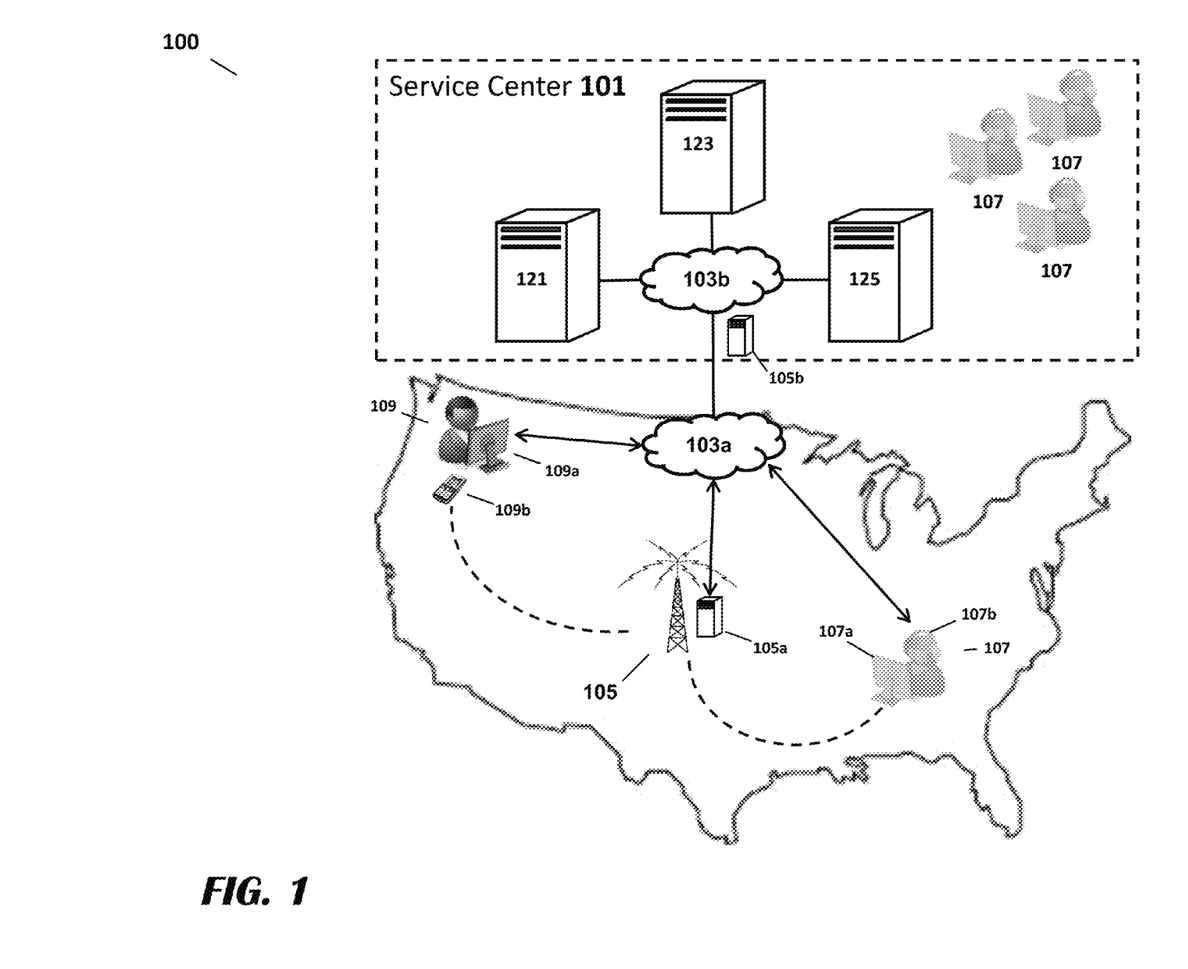
FIG. 1 shows components of a call system, according to an exemplary embodiment.

FIG. 1 shows components of a call system 100, according to an exemplary embodiment. The exemplary call system 100 comprises a call service center 101 and systems hosting various communication channels 103, 105. The service center 101 may be staffed by member service representatives (MSRs) 107 who may communicate with members 109 through the various channels 103, 105, or may service requests received from members 109 through the various channels 103, 105.

Members 109 may be individuals, groups of people, business units, companies, or any other entity or collection of people, who are potential or existing, customers, clients, or subscribers, to products or services offered by an organization. The organization may be most any entity that offers products or services, and hosts an enterprise system having a call system 100 for multichannel communication with members. 109. Non-limiting examples of organizations may include: banks, insurance providers, software companies, retail companies, manufacturers, and professional services companies. Members 109 may contact the organization through the organization's call system 100, by contacting a service center 101 of the organization. Members 109 may use a variety of communication channels 103, 105 to transmit to the organization, information about themselves or to open a service request regarding a service or a product offered by the organization.

Communication Channels

The system 100 may comprise various communication channels 103, 105, which may be any collection of hardware systems and software applications that may be used to host communications between members 109 and the service center 101. As shown in FIG. 1, non-limiting examples of the communication channels 103, 105 may include computing networks 103 and telephone systems 105.

A computing network 103 may be any collection of hardware devices (e.g., routers, firewalls, switches) and software applications that allow devices of the call system 100 (e.g., member computers 103b, MSR computers 107b) to communicate with one another. It should be appreciated that networks 103 may utilize a variety of computer communications, telecommunications, and/or networking technologies. That is, the network 103 may include a packet-switched network that utilizes computer-networking technologies (e.g., TCP/IP). As another example, the network 103 may include a circuit-switched network that utilizes telecommunications technology, such as cellular telephone protocols (e.g., EDGE, LTE, 3G, 4G), voice-over-IP (VoIP) technology, and/or telecommunication trunking protocols. Because the computing network 103 channel may implement multiple permutations of networking and telecommunication technologies, the computing network 103 channel may comprise a circuit-switched network that utilizes a packet-switching network, or vice-versa, for portions of a communication signal's traversal towards the signal's destination.

Furthermore, it should also be appreciated that the computing network 103 may be a private network 103b (e.g., intranet, VPN), public network 103a, or some hybrid of the two. A private network 103b may be a computing network 103 comprising hardware devices and software applications that are configured for secured networked-communications between certain users or devices that are within predetermined boundaries, such as a particular set of users, a facility, a campus, a region, a business unit, a company, or other pre-defined physical or logical boundary. The network 103 may also be a public network 103a (e.g., Internet), which may be configured to host networked-communication for most any users or devices that are capable of accessing and using the public network 103a resources. As an example, a member computer 109a may communicate over a public network 103a with certain public-facing devices of the call center 101, such as a firewall (not pictured) or a gateway router (not pictured); these gateway devices may then relay the communication over a private network 103b, to an internal device of the call center 101, such as a MSR computer 107a.

In some embodiments, internal or private networks 103b may be communications channels 103, 105 that are configured to host data-centric communications (as opposed to member 109 communications) that are generated from various computing services of the service center 101 or larger enterprise system, of which the service center 101 is just a part. As an example, an analytics server 121 may execute various programmatic routines for analyzing member call data that produces certain caller or MSR metrics. These metrics could be output by the analytics server 121, and communicated through a private network 103b communication channel, to certain devices of the call center 101, such as the MSR computer 107a.

Additionally or alternatively, the call system 100 may comprise a telephone system 105 communication channel. A telephone system 105 may comprise any number of telecommunications hardware devices (e.g., telephone exchange, switches, trunks, POTS, PSTN, cellular towers) and software applications or protocols (e.g., IPX, SPX, 3G, 4G, LTE, VoIP) that are configured to host telecommunications and telephony services, such as telephonic communication, short message service (SMS) messaging, and call center technologies. In operation, the telephone system 105 may host member calls. That is, when a member 109 calls the enterprise service center 101, to enter a request for a service or to seek product information, the telephone system 105 is the communication channel 103, 105 that is configured to facilitate the communication between a member communication device 109b and the MSR communication device 107b. It should be appreciated that the communication devices 107b, 109b may be ordinary telephones, cellular phones, smartphones, softphones, VoIP phones, or any other device hosting telecommunications for the particular user. It should also be appreciated that aspects of the telephone system 105 may be internal to the enterprise or service 101. That is, portions of the telephone system 105 may include public telecommunications systems (e.g., POTS, PSTN), but other portions of the telephone system 105 may be under the control and administration of the enterprise and, as such, some devices of the telephone system 105 may reside internal to the enterprise or service center 101.

In some embodiments, the telephone system 105 may generate call data about member calls, which the telephone system 105 then stores as records of the member calls into a call database 105a. In some cases, the call database 105a may generate records of member calls and then provides the records to a Datamart 125 of the service center 101; and, in some cases, the call database 105a may perform any number of analytics on the generated call data, and then provides the results to the Datamart 125. Records of calls may include a number of data fields containing data related to member calls. Non-limiting examples may include information about the member 109 (e.g., member number, member ID, request), information about the member communication device 109b (e.g., telephone number, device identifiers), information about each MSR 107 who is connected to the call (e.g., business units, MSR IDs), and other types of information about call (e.g., transfers, holds).

Organization Service Centers

A service center 101 may be staffed by MSR 107 who respond to member 109 requests, which may include requests for a service, or requests for products or information about products. In some embodiments, the telephone system 105 may be configured to intelligently route member calls to particular MSR 107 based on certain criteria. As an example, the organization may logically organize MSR 107 into functional units such that certain MSR 107 receive member calls related to certain subject matter. So for this example, the telephone system 105, acting as a directory, may be configured to route member calls regarding the organization's credit card products to a predetermined set of MSR communication devices 107b associated with MSRs 107 who are assigned to a credit card products unit.

As previously mentioned, portions of the telephone system 105 communication channel may be internal to the organization's enterprise or service center 101. An internal telephony system 105b may be any combination of hardware and software components that provide service centers 101 with call center technology and functions, such as multi-channel contact management, intelligent call routing and call distribution, and computer-telephony integration (CTI) features. The CTI features of an exemplary internal telephony system 105b may connect the telephony-based communications with the MSR computers 107a or other computing systems in the service center 101 or the organization's enterprise. As an example, the CTI features may provide MSRs 107 or system administrators with various software tools for viewing querying and viewing information relevant one or more member calls, or for managing the stream of member calls arriving via the telephone system 105 communication channel. Non-limiting examples of internal telephony systems may include Cisco® Unified Intelligent Contact Management (ICM) Enterprise, Avaya Aura® Call Center, and Genesys Omnichannel®. In many cases, the internal telephony system 105b may generate call data that may be stored in one or more databases within the service center 101 or enterprise. This call data may be provided to an analytics server 121, a Datamart 125, or other hardware or software application of the call system 100.

The telephone system 105 communication channel may intelligently route incoming member calls based on various preprogrammed rules. In some embodiments, the internal telephony system 105b may comprise various hardware devices (e.g., server, telecommunications router) configured to execute software programs that route incoming member calls according to the preprogrammed rules. The preprogrammed rules may be based on certain predetermined criteria and may comprise programmatic logic that instructs the internal telephony system 105b on advancing through a logical decision tree for determining where to intelligently route the member calls. After the internal telephony system 105b resolves which MSR 107 should receiving a member call, the internal telephony system 105b may route the member call to the corresponding MSR communication device 107b. For example, in some implementations, the preprogrammed rules executed by the internal telephony system 105b may be based on one or more metrics or scores associated with the MSRs 107. Using records of member calls generated from the phone system 105, the metrics and scores may be tabulated for various MSRs 107 and the member calls may be routed accordingly. It should be appreciated that the tabulation may be executed by the Datamart 125 or any hardware or software component coupled to the Datamart 125, such as a call database 105a, an analytics server 121, or any other hardware or software components of the service center 101 or system 100. In this example, a member call may be routed to MSRs 107 who are comparatively more effective or efficient at handling requests of the particular type submitted by the member. It should be appreciated that MSR 107 metrics are but one exemplary criteria used for intelligently routing member calls, and that other criteria may be used by the telephone system 105 to intelligently route member calls to MSRs 107.

Service Center Systems and Datamart

It should be appreciated that, although a number of computing devices are shown in FIG. 1 to represent different functional computing resources (e.g., Datamart 125, analytics server 121) of the service center 101, it should be appreciated that the various types of servers may reside on any number of computing devices. That is, a single computing device may be configured to execute one or more software applications. A computing device may also host any number of databases, regardless of whether the computing device is responsible for executing additional or alternative software applications.

A Datamart 125 may be a database that stores data records or tables containing information about call paths and call segments associated with member calls. The Datamart 125 may be hosted on one or more computing devices comprising non-transitory machine-readable storage media and one or more processors that execute various software applications to perform the processes and tasks described herein. The devices hosting the Datamart 125 may be accessible, through one or more computing networks 103, to various computing resources, computing devices, software applications, and databases, which may communicate data to the Datamart 125. In some cases, the Datamart 125 may be hosted on one or more computing devices that are accessible to any number service centers 101, which may or may not be a location of a service center 101. In cases where the Datamart 125 is hosted over a plurality of distinct computing devices, the devices may be configured to communicate and update data, and/or replicate data based on events or at predetermined intervals.

The Datamart 125 may store two sets of data related to member calls: master call path data and call segment data. A master call represents the lifespan of a single member call, from start to end. A call segment may be a portion of a master call that is associated with a point of contact that interacts with the member (e.g., MSR 107, interactive voice response system), or a transfer of the member call to a subsequent point of contact. The master call may comprise one or more segments, which correspond to each point of contact that interacted with a member during the life of the master call. A master call path comprises a set of the call segments that may be identified using call records and other call-routing data, stored in the Datamart 125 and/or various other data sources. In some implementations the call system 100 may be configured such that the master call path comprises at least one call segment associated with a MSR 107, which guarantees that the member 109 who called the service center 101 has an opportunity to speak directly to a MSR 107. Each transfer to a subsequent point of contact (e.g., MSR 107), occurring during the life of the master call, may result in instantiating an additional call segment of the master call path.

Conventional call center technologies often do not identify or distinguish between master calls and call segments. As such, conventional call center technologies may produce master call data or call segment data. Servers hosting the Datamart 125 or related analytics servers 121 may execute various algorithms to identify master calls and call segments, using data transmitted to the Datamart 125 from various data sources of the service center 101 and/or system 100. The algorithms for the Datamart 125 may cross-reference data sent from the various data sources to identify potential relationships in the data that suggest a master call or call segment was initiated or terminated. In some implementations, the algorithms may be probabilistic, i.e., determine that a master call or call segment has been identified in the data when a number of suggestive data points satisfy a likelihood threshold. In some implementations, the algorithms may be deterministic, i.e., determine that a master call or call segment has been identified in the data based on identifying a set of data points satisfying a set of indicator requirements. In some implementations, the algorithms may be a hybrid of the two.

A call system 100 may comprise one or more analytics servers 121, which, in some cases, may be housed at service centers 101. An analytics server 121 may be one or more computing devices executing software applications that perform analytical algorithms on the data produced by and collected from, various data sources of the system 100, such as a call database 105a, an internal telephony system 105b, or a webserver 123. The analytics server 121 may fetch data from the Datamart 125, to perform analytics on the master call data and call segment data. For example, the analytics server 121 may perform various algorithms that determine the effectiveness and efficiency of particular MSR units. It should be appreciated that, in some embodiments, the Datamart 125 may reside on the same device as the analytics server 121; and, in some embodiments, the analytics server 121 is an aspect of the Datamart 125, and may perform the algorithms for identifying master calls and call segments in the data provided to the Datamart 125.

A webserver 123 may be a software application that is executed by one or more computing devices comprising a processor and that hosts a website for the organization. In some implementations, the webserver 123 may be configured to capture or query data related to a member's 101 ongoing or prior sessions interacting with the website, thereby generating a web history for the member 109. The web history data may be stored into the Datamart 125 or other database of the system 100, as a set of records related to a network 103 communication channel or related to an additional Internet-based communication channel. The web history data may be analyzed by an analytics server 121 and provided to a MSR 107 during member call associated with the member 109.

Call databases 105*a* may store call records that contain call data and information about member calls. Call databases 105*a* may be hosted on one or more servers of the system 100. Servers hosting call databases 105*a* may be any computing device comprising non-transitory machine-readable storage memory and processor allowing the call databases 105*a* to perform the various tasks and processes described herein. The call system 100 may comprise any number of call databases 121, of which there may be one or more types of call databases 121 that store data of various types. Non-limiting examples of call databases 105*a* may include: call records databases, voiceline records, service and sales activity records, data warehouses, MSR databases, and member disposition databases, among other types of call databases 105*a*. Non-limiting examples of the types of data in the various call databases 105*a* may include: call information data, transfer details, and member information data, among other types of data that may be stored in call databases 105*a*. Although FIG. 1 shows an exemplary call database 105*a* being found with a telephone system 105 facility, it should be appreciated that servers hosting the call databases 105*a* may be located at other locations, such as service centers 101, facilities housing components of the telephone system 105, or any other location allowing the servers hosting call databases 105*a* to receive call data produced by the telephone system 105 and transmit the call data to the Datamart 125.

A member 109 may use a member communication device 109*a* to call the service center 101, which instantiates a member call with a service center 101 through a telephone system 105 communication channel. The member call may be hosted and routed through the telephone system 105, which may eventually route the member call to a MSR communication device 107*a*. The member communication device 109*a* may be any hardware device capable of telephony-based telecommunications. That is, the member communication device 109*a* may comprise any permutation of hardware, firmware, and/or software for communicating with the MSR communication device 107*a*, using telecommunications protocols. Non-limiting examples of a member communication device 109*a* may include a conventional POTS telephone, a cellular telephone, a smartphone, a VoIP phone, and a softphone (executed on a computing device, tablet, or smartphone). In some cases, the member 109 may communicate member information or service requests to the organization, through a computing network 103 channel, using a member computing device 109*b*. For example, the member 109 may be traversing the various webpages of the organization's website, which may be hosted on a webserver 123 located in the service center 101 or elsewhere in the system 100. The webserver 123 may be configured to capture or query data related to the member's 101 prior or ongoing web sessions. This web history data be stored into a Datamart 125 as a set of records for an additional communication channel 103, 105, which may be analyzed by an analytics server 121 or other application executed by a computing device of the system 100. In some cases, the web history data of the member may be provided to the MSR 107 during the member call, to provide the MSR 107 more information about the member 109 or to provide the MSR 107 with context for the underlying reasons for the member call.

As mentioned, a member service representative (MSR) 107 may staff service centers and may serve the functional role of identifying and addressing a member's 109 needs or concerns, which may have prompted the member to call the service center. The MSR 107 may use an MSR communication device 107*a* to receive member calls routed from an internal telephony system 105*b* to the MSR communication device 107*a* or MSR unit. The MSR communication device 107*a* may be any hardware device capable of telephony-based telecommunications. That is, the MSR communication device 107*a* may comprise any combination of hardware, firmware, and/or software for communicating with a member communication device 109*a*, using telecommunications protocols. Non-limiting examples of an MSR communication device 107*a* may include a conventional POTS telephone, a cellular telephone, a smartphone, a VoIP phone, and a softphone (executed on a computing device, tablet, or smartphone).

An MSR 107 may also handle requests for services or products submitted by members 109. In some implementations, an MSR 107 may operate an MSR computer 107*a* that is configured to execute one or more member service applications, which may provide the MSR 107 with information about the member 109 and service requests. The MSR computer 107*a* may be connected to an internal network 103*b* and may execute software applications that provide computer-telephone integration (CTI) features that allow the MSR 107 to manage the member call and address the member's 107 request. In some cases, the MSR 107 may input or revise data records of databases connected to the member service application. Using the member service application, the MSR 107 can update the status of requests, receive alerts regarding members or offers to present to members, and query databases of the system, among other executable routines used to address member needs or requests. As an example, an MSR 107 may completely satisfy a request for a new auto loan submitted by a member 107, thereby satisfying the member's need that prompt the member call. However, the member service application may automatically determine that is highly likely that the member 109, who did not previously own a car, requires auto insurance. The member service application may then present an alert, through a user interface, prompting the MSR 107 with a prompt to offer auto insurance to the member 109. In this example, the MSR 107 may open a new request for an auto insurance product, if the member 109 indicates interest.

In some cases, the MSR 107 may receive information or service requests from a member 109, through a computing network 103 channel, using an MSR computing device 107*b*. For example, a member 109 may be traversing the various webpages of the organization's website, which may be hosted on a webserver 123 located in the service center 101 or elsewhere in the system 100. The webserver 123 may be configured to capture or query data related to the member's 101 prior or ongoing web sessions. The web history data and click trail information of the member computing device 109b, may be provided to the MSR communication device 107a, to display to MSR through the MSR service application, during the member call. The MSR 107 may then receive additional information about the member 109, such as the member's 109 click trail or other forms of multichannel communication. The multichannel information may provide the MSR 107 with additional context regarding the needs or concerns of the member 109, which may have motived the member call.

Exemplary Process for Data Collection, Analysis, and Record Generation

Figure 2:
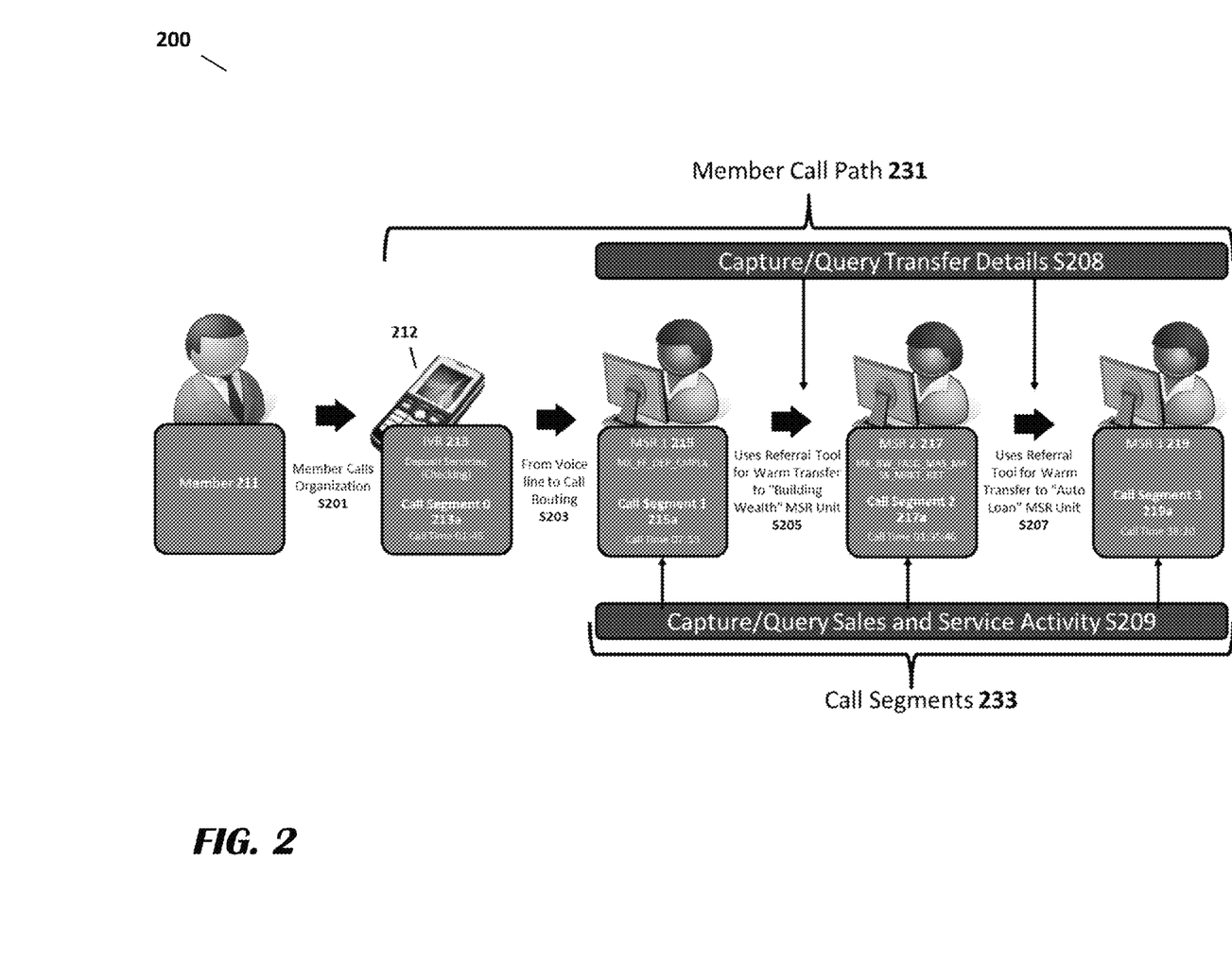
FIG. 2 shows an exemplary process of deriving call path data and call segment data based on data that results from servicing a member call.

FIG. 2 shows an exemplary process 200 of deriving call path data and call segment data based on data that results from servicing a member call. Members 211, who may customers, clients, associates, or participants, to an organization that offers members 211 services or products associated with the organization's mission or business model. In some instances, members 211 may wish to contact the organization to seek help or clarification on the services or products offered by the organization. The organization may have established service centers staffed by any number of MSRs 215, 217, 219 who help address the needs and concerns of members 211. The exemplary process 200 shows the components of servicing a member call that may be used to trigger data gathering, event logging, and data analytics by systems of the service center. The exemplary process 200 may generate data that defines the member call from multiple perspectives, such as the perspective of a member perspective (i.e., member call path 231) or the perspective of an organization's service center (i.e., call segments 233). A member perspective is the collection of events that occur during a member call, from the perspective of the member 211. In many instances, this includes the entirety of the member call, i.e., from the ring signal until the member is disconnected from the service center, because from the member's perspective, a member call is a single event (i.e., a phone call), as opposed to a series of discrete events.

Conventional call center processes and related tools typically process calls or generate metrics without considering the perspectives from which data is generated, analyzed, or applied. The exemplary process 200 may comprise a series of events executed by telephony and computer devices when the devices support the servicing of a member call. The events may also trigger the telephony and computer devices to develop data records that may be used by a Datamart to establish data records providing insight into members calls from any number of perspectives. These data records may then be stored into the Datamart, analyzed by additional software analysis tools, and applied by software applications and tools of the service center, or broader organizational enterprise, to improve service and product effectiveness and satisfaction. For example, perspective data records (e.g., call path records, call segment records) may be applied by software applications, to generate various reports and metrics. In another example, the perspective data records may be used to manually or automatically (i.e., machine-learning, or event-based updating) adapt programmatic execution rules of various devices and software tools.

Call Servicing

In a first step S201, a member 211 may use a member telephone 212 to call an organization. The telephone call may traverse a public telephone network and may be routed, to an internal telephony system of the organization, based on the telephone number dialed by the member 211. In some embodiments, the internal telephony system may generate call data records and log data that contains information about the telephone call form the member 211. The data may include the telephone number of the member telephone 212, the telephone number reached by the member telephone 212, and where the member call is routed. In some embodiments, the telephony system may comprise an interactive voice response (IVR) system 213, which may present members 211 with various menus for authenticating the members 211 and identifying the reasons behind the member's 211 call, based on the member's inputs. It should be appreciated that there is no requirement to have an IVR system 213, however. In some cases, the member call may be routed directly to an MSR 215, 217, 219, based on programmatic rules.

In the exemplary process 200, the member call may be routed to an IVR system 213, which results in instantiating an opening segment 213a (i.e., "Call Segment 0"); however, the member call could also be instantiated whenever the member telephone 212 is connected to a device or MSR of the organization. Connecting the member telephone 212 to the IVR system 213 may cause the software applications driving operations of the telephony system, and the software applications of the IVR system 213, to generate call data indicating that the member telephone 212 was connected to the IVR system 213. Additional call data may be generated, indicating that the IVR system 213 executed certain tasks, such as authenticating the member 211 and routing the member call. The generated call data may be stored into one or more call databases, of various types of databases, depending upon which device or software application that originated the data.

In a next step S203, an IVR system 213 or voiceline may route the member call to a Banking MSR 215, based on the member's 211 selected menu options, inputted through the member telephone 212, in response to the menu prompts of the IVR system 213. In this step, a member request for services or products may be identified. The member request may be the underlying need or reason that the member 211 called. In some instances, as the member's 211 needs or concerns are addressed, new concerns or needs may be identified during the life of the member call. To address the member's 211 evolving needs, in some embodiments, alternative or additional member requests may be generated for member service applications, the new needs or concerns may be identified by software applications or by MSRs 215, 217, 219.

In the exemplary process 200, a determination of the member request is made by the IVR system 213, using programmatic rules to respond to the member's 211 inputted selections. That is, as the member 211 responds to the menu prompts of the IVR system 213, the IVR system 213 references programmatic rules that instruct the IVR system 213 how to respond to each input received from the member telephone 212. The IVR system 213 resolves whether the member selection requires the IVR system 213 to present a subsequent menu, or whether the member 211 has provided sufficient responses that the IVR system 213 may route the member call to an MSR 215, 217, 219. In some embodiments, the IVR system 213 may resolve the member's needs from the responses, and may then predict the member's request based on the identified need or concern. In such embodiments, the criteria for identifying a need and predicting the member need may be found in the code of the programmatic rules instructing the IVR system 213. In some embodiments, the member 211 may expressly indicate his or her request for a service or product, from the menu options provided by the IVR system 213. As mentioned, once the member request is determined, a new request record may be stored into a database associated with a MSR service application, or helpdesk software.

Continuing with the initial segment 213*a*, after determining the member request, the IVR system 213 may route the member call to an MSR 215, 217, 219, based on the member request. That is, in some implementations, member requests or needs may be mapped in the programmatic rules, to particular MSR units who have been assigned to handle requests within a particular domain of services or products. In some embodiments, the programmatic rules may provide criteria or instructions for determining or fetching additional call-routing criteria. For example, member calls may be routed according to business domains of the service or product (e.g., banking credit cards, wealth management, insurance products) and also efficiency of the MSRs, such that the member is routed to those MSRs 215, 217, 219 meeting certain threshold criteria for performance. Non-limiting examples of threshold criteria may include: the amount of time that an MSR 215, 217, 219 is able to address member requests; the frequency with which an MSR 215, 217, 219 successfully sells or cross-sells products or services; the frequency with which the MSR 215, 217, 219 has a successful disposition of the call; how content members are with the service of an MSR 215, 217, 219 based on post-call surveys; or any other measured performance metrics for an MSR 215, 217, 219. This schema may be implemented to minimize the number of members calls that are placed into call queues of the telephony system, because it throttles the volume of calls being routed to more efficient or less efficient MSRs 215, 217, 219 or MSR units. It may also be implemented to deliberately directed member calls from certain members 211 to more preferred MSRs 215, 217, 219, or more effective or efficient MSRs 215, 217, 219. It should be appreciated that additional or alternative criteria may imposed by an internal telephony system for routing and distributing member calls.

In the example of FIG. 2, the IVR system 211 has resolved that the member 211 is requesting help with a checking account. The IVR system 211 may be instructed by the programmatic rules which MSR or MSR unit should receive the member call. In this case, the member call may be routed to a banking MSR unit, so that the member may be connected to a banking MSR 215. In some implementations, the programmatic rules may instruct the telephony system or the IVR system 211 where to route the member call—i.e., which MSR or MSR unit, and which phone number or extension. In some implementations, the programmatic rules may identify the appropriate MSR or MSR unit to handle the request, but may instruct the IVR system 211 to then reference a directory database or extension table, to determine where to route the member call.

In the current step S203, when the member call is routed from a voiceline or IVR system 213, call data records may be generated, such as event logs. These logs may be stored into various databases of the enterprise that function as data sources of the Datamart, such as a call database associated with an internal telephony system. The Datamart may then analyze the data outputs from the software applications and telephony system produced around the time that the member call was routed to a Banking MSR 215. The call data generated when the member call is transferred to the Banking MSR 215 may include information such as the time the initial segment 213*a* ("Call Segment 0") terminated, the amount of time that the initial call segment 213*a* (1:45), and information about where the member call is being transferred. When the call is successfully transferred to the Banking MSR 215, a banking call segment 215*a* ("Call Segment 1") may be initiated. It should be appreciated that the various devices and software components of the enterprise system may be configured to generate data in response to an event like a call transfer, which may be a substantial amount of data when considering manual or conventional analysis techniques. The Datamart may be configured to identify indicators of call segments in the data provided by from the various data sources. These indicators may be data points that suggest or expressly indicate that a call segment was initiated or terminated between the member telephone 212 and an MSR telephone. The Datamart may identify these indicators from each of the data sources and then cross-reference them according to the particular algorithms executed by the Datamart. The Datamart then generates a new call segment record upon identifying a threshold amount of indicators suggesting there is a new call segment.

In some implementations, MSRs 215, 217, 219 may be organized into MSR units that, the Banking MSR 215 may be an MSR who is associated with a Banking MSR unit. It can be appreciated that the exemplary MSR units described herein are only intended for exemplary purposes, and not intended to be limiting upon the scope technology. For example, if an organization is a car manufacturer, the service center may host a factory recall MSR unit. The Banking MSR 215 may receive the member call when the member call is routed from the IVR system 213, at which point the Banking MSR 215 may begin working with the member 211 to address the ongoing member requests.

The Banking MSR may access an MSR service application, which may provide MSRs 215, 217, 219 of the call center with access to member 211 data and other information about the products or services related to the request from the member 211. The MSR service application may generate data, which may be stored into one or more databases of the system (e.g., member database, MSR database, product database, service activity database) or may be provided directly to a Datamart. In some embodiments, because the MSR service application is capable of generating new data or manipulating existing data of various types, the MSR service application may be configured as a data source of the Datamart, which means the MSR service application would feed call data and other types data (e.g., member data, MSR data), to the Datamart.

During the banking call segment 215*a*, after a member 211 has submitted, via an IVR 213 menu selection, a request to transfer funds between accounts, a Banking MSR 215 may use the MSR service application to access banking databases, and assist with transferring funds between the member's 211 accounts, thereby satisfying the request. The Banking MSR 215 may update an entry for the member's service, which may trigger updates to various databases of the enterprise system, such as databases that store data related to member service activity. In the process of the call segment 215*a*, the Banking MSR 215 may have flagged a life event, i.e., updated an entry for the member in a member database, when the member 211 mentions a new job. In some embodiments, this may trigger one or more new options, and may result in new data entries or revisions to data stored in various databases of the enterprise system. Each of these revisions and changes may be transmitted to the Datamart, which may analyze and cross-reference the generated data from each of the data sources. The Datamart may also provide this data to software applications of the systems.

In a next step S205, after a Banking MSR 215 or a member 211 has submitted an additional request for a service or product, the MSR 215, 217, 219 may use a referral tool feature of the MSR service application to identify an MSR 215, 217, 219 or MSR unit designated to handle the additional request. In some embodiments, the referral tool may be integrated with an internal telephony service, allowing it to direct how the member call is routed, so that the member call is routed to the appropriate MSR 215, 217, 219 or MSR unit. In some embodiments, MSRs 215, 217, 219 use the MSR service application to instantiate a "warm transfer" where a transferee MSR 215, 217, 219 may be conferenced into the ongoing member call. Often, an MSR 215, 217, 219 will place the member 211 on hold to identify the appropriate MSR 215, 217, 219 or MSR unit to address the new request for services or products. In some embodiments, the Datamart may be configured to identify events that occurred during the member call that may help the Datamart distinguish the initiation or termination of a call segment. In some cases, call events that lengthen the member call, such as putting the member on hold or transferring the member call before resolving a request, may be identified and distinguished by the Datamart as a call segment or a sub-segment portion of a call segment.

In the exemplary process 200, the member 211 may have expressed a need for more directed savings and investments to the Banking MSR 215, and so requested options for financial investment products (e.g., mutual fund) or wealth management services. In this example, the Banking MSR 215 may enter a request for a mutual fund into the MSR service application. In some cases, the submission of the request may then update data sources of the Datamart of the service center. Using the MSR service application, the Banking MSR 215 may instantiate a warm transfer connecting a Wealth MSR 217 to the ongoing member call.

A Wealth MSR 217 may also address outstanding requests for a mutual fund, among other requests for services or products. The Wealth MSR 217 may revise or update data in one or more databases of the service center, using the MSR service application. The member may then indicate an additional need for, e.g., car financing, which is then identified by the Wealth MSR 217 or the MSR service application as a need best served by offering and opening an auto loan product. Using the MSR service application, the Wealth MSR 217 may identify an Auto Loan MSR 219 or Auto Loan MSR unit.

In a next step S207, the Wealth MSR 217 may instantiate a warm transfer with an Auto Loan MSR 219, which conferences the Auto Loan MSR 219 into the ongoing member call. In this step S207, the telephony system, MSR service applications, and other data sources may generate and store data related to the member, the member call, the requested services or products, and the MSRs. This data may then be fed to the Datamart from the respective data sources, at a predetermined interval or trigger. The Datamart may then use this data to identify and distinguish events and call segments.

In this example, the Auto Loan MSR 219 may be last MSR the member 211 speaks with, and so after this call segment 219a ("Call Segment 3") the member call is terminated as one or both parties (i.e., member 211 and Auto Loan MSR 219) hang up their respective telephones. In some cases, terminating the member call may trigger the telephone system, internal telephony system, and other data sources to generate call data relating to the member call, containing data indicators the member call was terminated. The data that is generated when the member call is terminated may be stored into a Datamart or into a database associated with the data source that generated that data, and may then be forwarded to the Datamart at a predetermined interval or in response to a predetermined event.

Data Capture and Query

The exemplary process 200, shown in FIG. 2, for collecting and generating call path records and segment records, is an exemplary embodiment in which data is produced by hardware and software components as result of events that occur during member calls (S201-S207). In the exemplary process 200, this data may then be analyzed by a Datamart to generate call path records and segment records (S208-S209). Is should be appreciated, however, that embodiments are not limited to such a linear execution. Instead, it can be appreciated that predetermined intervals or predetermined events may trigger certain routines by any of the components of the system. For example, in some cases, a telephony system acting as a data source for the Datamart may be configured to provide call data to the Datamart at a weekly interval. In some cases, the data sources may transmit the data to the Datamart the moment the data is generated or the data-generating routine is completed; the Datamart may continuously received the data as it is being generated, but may wait until a predetermined event to trigger, such as the termination of the member call, to begin analyzing the data from the member call. It should also be appreciated that there may be any number permutations to the order of executing the steps described herein, or additional or alternative steps. In some embodiments, data processing may be entirely or nearly entirely event-driven, and so there may be little or no pre-established order for executing the various processing steps.

Various types of data, such as transfer details, or sales and service activity, may be generated by data sources (e.g., software applications, telephony systems, databases) of the call system. This data may be transmitted to the Datamart at a given interval or based on an event trigger. The Datamart, or other servers and software of system, may store this data and execute various algorithms that identify in the data a member call path 231 and one or more call segments 233. A member call path 231 may be a data record generated by the Datamart that represents the scope of events that occur during a member call, taken from the perspective of the member 211. As such, in many cases, the member call path 231 is represented in a call path data record, which may contain information about the whole member call, from initiation of the member call (i.e., when the member telephone 212 is connected to an initial segment 213a), through termination of the member call. The member call path 231 may comprise one or more call segments 233, which represent connections between the member 211 and point of contacts (e.g., IVR system 213, MSRs 215, 217, 219, call holds) connected to the member telephone 212, where the call segments 233 are established as a collection of discrete actions when considered from the perspective of the call system. As such, the call segment data 233, generated by the Datamart, may be data records that contain information about call segments 213a, 215a, 217a, 219a of the member call path 231, when the member telephone 212 is connected to a point of contact, placed on hold, or placed into a call queue.

In a next step S208, after data of various types have been generated by hardware or software components of the call system, a Datamart may capture and query transfer details, which may be a one or more types of call data generated by components of the call system whenever a member call is transferred between points of contact. In some embodiments, when a transfer is executed—i.e. when a member call is routed to a new point of contact to instantiate the next call segment of the call path—the Datamart may receive or fetch data of various types, such as transfer details, from data sources of the system. In some embodiments, data sources may be configured to transmit data to the Datamart as predetermined intervals, which may or may not be independent of call events like call transfers. After the Datamart captures (i.e., received or fetched) the data from the data sources, then, continuing with the current process step S208, the Datamart may query the data to identify indicators of the member call path 231. That is, the Datamart may be configured to identify in disparate types of data, values or event logs that suggest or expressly indicate that a member call path was instantiated or terminated by the telephony system.

Continuing with current step S208, the Datamart may query and analyze the transfer details to determine temporal boundaries of the master call path 231, and the temporal boundaries of call segments 213a, 215a, 217a, 219a, based on data that suggests or expressly indicates that certain events occurred at certain times during the member call (e.g., transfers, holds, warm transfers, connection terminations). Transfer details may be data of various types, and may contain data identifying, e.g., which point of contact the member telephone 212 was previously connected, a type of transfer (e.g., warm transfer, hard transfer), a type of event associated with the transfer, and the time of the transfer, among other data fields that may be found within the transfer details data. In some embodiments, the Datamart may automatically develop additional data fields for the transfer details, by analyzing multiple types of data from multiple data sources. As an example, in some cases, the telephony system may provide transfer details data from a call database, where the transfer records contain explicit indicators of a transfer, such as a time of transfer data field, as well as an additional data filed indicating the member 211 was put on hold. In this example, the Datamart may determine that a transfer occurred from a Banking MSR 215 to a Wealth MSR 217, based on the indicators from the transfer details data; but, the Datamart may also determine that the type of transfer was a "warm transfer," based on data cross-referenced from other data sources.

In a next step S209, after the Datamart has generated data records related to the member calls, such as a master call path 231 and call segments 233, the Datamart may capture (i.e., receive or fetch) sales and service activity data from one or more data sources. Sales and service activity data may be a variety of types of data, generated from any number of data sources that output data related to sales and services of the organization. These data sources may be hosted on any number of server devices comprising a processor that executes a sales or service activity software application. These data sources may also include databases configured to store outputted data from the sales or service activity software applications. Non-limiting examples of sales and service activity data sources may include: a referral and marketing management application (e.g., Unica®, Eloqua®), a customer relationship management application (e.g., Salesforce®, SAP®, Microsoft Dynamics®), an MSR service application (e.g., Aceyus®, Interactive Intelligence® Customer Interaction Center™), and a products database, among other types of data sources. Although the exemplary process 200 shows that sales and service activity is being captures and queried by the Datamart, it should be appreciated that in some cases, software applications and other computing services of the call system may request sales and service activity data from the Datamart.

In some embodiments, the Datamart may receive the sales and service activity data from the respective data sources and then store the data into a data record of a member call path 231 or a data record of a call segment 233. For example, the sales and service activity data sources may include a customer relationship management (CRM) data source that dynamically identifies and present to, e.g., an Auto Loan MSR 219 products or services to offer the member 211. The CRM data source may later provide data records containing data fields indicating the offered products, the members those products were offered to, and the success or failure rate of members' 211 acceptance. One or more data fields of this offering data may be provided to the Datamart, which may cross-reference data fields in the offer data (e.g., member IDs, MSR IDs), against data fields in the member call path record 231, and data fields of a data record for an Auto Loan call segment 219a in the call segment data records 233. In addition, in current step S209 or at a predetermined time or triggering event, the Datamart may cross-reference data from sales and service activity data to generate additional data fields, which may then be stored into the data records of call paths 231 or data records of call segments 233. Continuing with the previous example, the offer data fields may include a data field identifying the Auto Loan MSR 219 (e.g., MSR ID), which the Datamart may cross-reference with an MSR database, which may store provide the Datamart with data related to MSRs 215, 217, 219 and MSR units. The Datamart may dynamically determine the offer effectiveness of the Auto Loan MSR 219 and then update or generate one or more records for the Auto Loan MSR 219 to include data fields indicating the effectiveness of the Auto Loan MSR 219 at selling or cross-selling products and services of the organization.

The data stored or generated by the Datamart may be queried or transmitted to any number of software applications or devices, to improve understanding of members and to improve understanding of the service centers' effectiveness. For example, in some embodiments the Datamart may output data it has generated or revised, such as the MSR cross-sales data, to other software applications of the system, which may use the cross-sales data to adapt the various analytics used to determine better marketing strategies. As another example, in some embodiments the Datamart may be queried by report-generating software tools, which may query and filter data from the Datamart and present the results on a graphical user interface (GUI) in any number of human-legible formats. In a further example, in some embodiments the Datamart data may update performance metrics data fields in an MSR database, which may also be referenced as a directory by a call telephony system, when the call-distribution functions are determining where to route member calls. In other words, as a result of performing any number of capture and query steps S208, S209, the Datamart may automatically generate and output data that may be used to automatically update data stored elsewhere in the system, influencing the execution of other devices' functions.

Member-Centric Call Datamart and Data Sources

Figure 3:
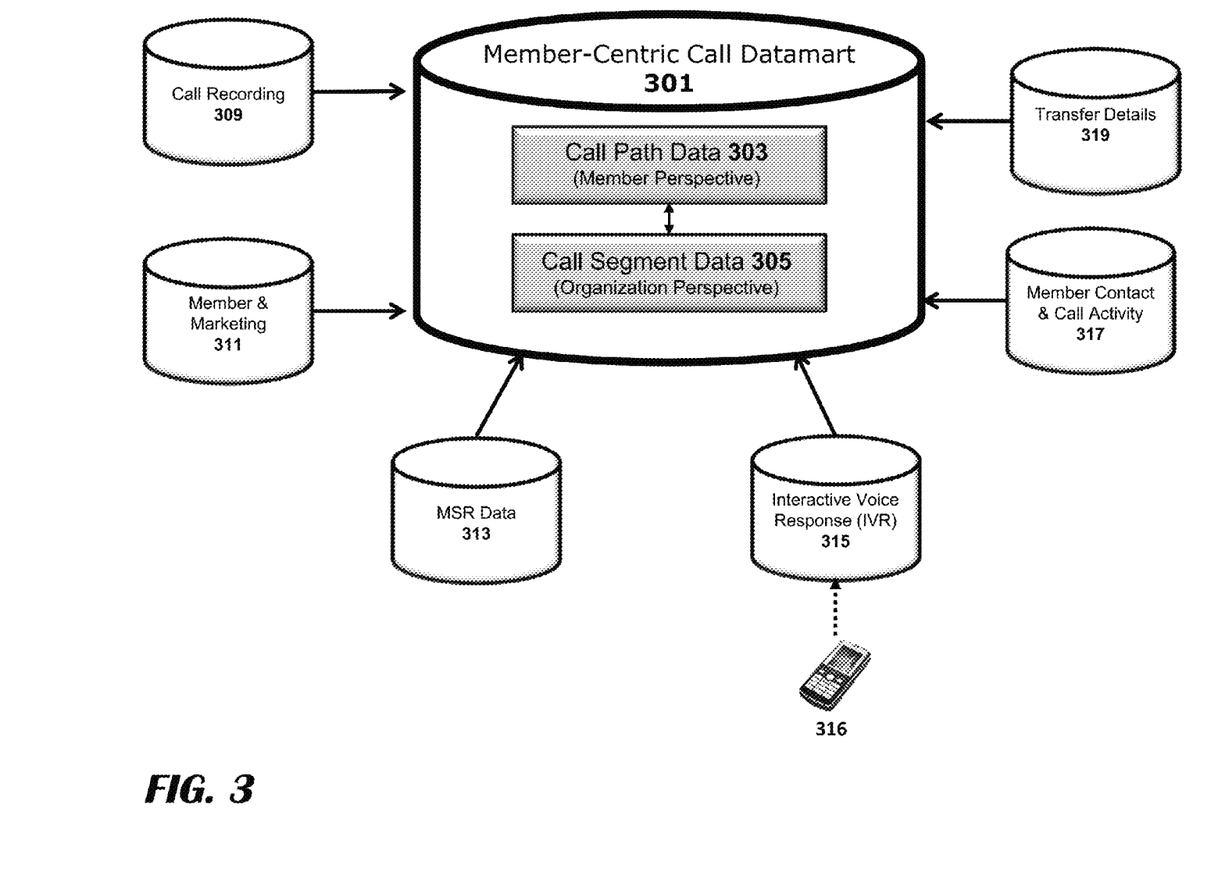
FIG. 3 shows components of a call system, according to an exemplary embodiment.

FIG. 3 shows components of a call system 300, according to an exemplary embodiment. More specifically, FIG. 3 shows an exemplary Datamart 301 of a call system 300 and the various data sources that collect and transmit data to the Datamart 301.

Member-Centric Datamart (Datamart)

A Datamart 301 may store data about member calls received from various data sources. The Datamart 301 may contain records or tables that contain two types of data: call path data 303 and call segment data 305. It should be appreciated that the Datamart 301 may store additional types of data, as well. or In some cases, the Datamart 301 may be capable of deriving The Datamart 301 may store two sets of data, master call path data 303 and call segment data 305. Master calls are the lifecycle of member calls, from initiation to termination, from the perspective of a member who has contacted a server center. Each master call may be logically segmented based on each point of contact that occurs between the member and the service center, during the lifespan of the master call. A call segment may be a "part" of a master call, which may be identified at each new point of contact. A master call may be logically represented as a master call path that comprises the one or more call segments associated with the master call. Every new point of contact with a contact (e.g., interactive voice response (IVR) system, representative) that occurs during the master call instantiates an additional call segment, which may result in call data (e.g., transfer details) being generated by telephony systems.

Call path data records and call segment data records may be derived by one or more call data analysis applications, which may be executed by the Datamart 301 or other computing device executing the software application. The call path analysis application may perform data queries and/or analysis algorithms, which the call path analysis application applies using the data received from various data sources of the call system 300. Master call paths and call segments may not be expressly identified, generated, or stored, in the data provided to the Datamart 301, because conventional software applications and tools associated with an internal telephony system may not be configured to store data about master call paths and/or call segments. As such, the Datamart 301, or other server of the system 300, may execute software applications that perform various algorithms that identify relationships among the data provided from various data sources suggesting that the status of the master call has changed, such as an indication that a master call or call segment has been initiated or terminated. A relationship may be identified by querying and cross-referencing data provided from the various data sources, based on the predetermined indicators that suggest a change to the status of the master call or call segment.

The Datamart 301 may store call path records in a call path dataset 303. The call path dataset 303 may be a table or other data construct for database records containing data related to master calls, such as member call events, call status, and lifecycle timing, derived from data transmitted from one or more server that host various data sources, configured to feed various types of data to the Datamart 301. Non-limiting examples of the types of data stored in the call path data records 303 may include: initiation time, termination time, length of master call, member communication device information, and transfer data, among other types of data. In operation, call data may be generated by software applications that monitor or administer the telephony communication channel (e.g., Cisco ICM®, Avaya Aura®) of the call system 300. In some cases, call data may also be generated and fed to the Datamart 301 by software applications that execute various data outputs in response to activities associated with member calls (e.g., marketing software tools).

Events occurring during a master call, such as call instantiation or call transfers, may trigger software applications of various data sources to execute routines, output data, and generate logs. The results produced by these software applications may be call data associated with each data sources' functional role within the call system 300, as generated by the software applications. In some embodiments, the call data produced by the disparate software applications may be stored in disparate databases, configured to store data used by or produced from corresponding software applications. Call data of a data source may be transmitted to the Datamart 301 from servers hosting a data source's software application or database, and may be transmitted in real-time, at predetermined intervals, or in response to given events triggering data transmission. At predetermined intervals, or in response to predetermined events, the Datamart 301 may be configured to analyze the disparate types of call data received from the disparate data sources, to identify in the call data indicators of an event that occurred in the master call.

As an example, when a member contacts a service center, the member's communication device 319 may be routed by the telephone system to an interactive voice response (IVR) system 315. Call data may be generated by data sources, such as call-routing applications, call recording applications 309, and the IVR system 315, and the call data may be stored into databases corresponding to the data sources. The data sources may then transmit the call data generated by the data sources to the Datamart 301, based on a predetermined trigger or interval. The Datamart 301 may execute queries and algorithms that identify in the call data from the data sources, such as the call recording system 309 and the IVR system 315, indicating or suggesting that a new master call was instantiated. When the Datamart 301 identifies sufficient call data indicating that a new master call was instantiated, the Datamart 301 may generate a new data record of a call path for the newly-identified master call. The Datamart 301 may then store the new call path record (i.e., call path record) into the call path dataset 303. The new call path record may contain data fields for the instantiation time, member information (e.g., member ID, data related to member communication devices 319), and information about the master call path, among other forms of data describing the master call. In some embodiments, a call path record may comprise one or more data fields containing segment data, which may identify and describe the call segments of the master call path. In some cases, the segment data fields may link, cross-reference, or otherwise associate a call path data record, of a particular master call path, with a data record of a call segment identified by the Datamart 301.

The Datamart 301 may store call segment dataset 305, which may be a dataset or table of database records that contain data related to call segments of a master call path, which may result from events that occur during the life a master call. The call segment records may be derived by call data analysis applications executed by the Datamart 301 or other computing devices connected to the Datamart 301. The call data analysis applications may perform data queries and call data analysis algorithms, which the software applications may apply against the call data transmitted from servers hosting the data sources generating the call data. Non-limiting examples of the types of call data stored in call segment records may include: call events, call data related to call transfers, hold time, initiation time of call segments, termination time of call segments, length of a call segment, and member communication device information, among other types of data. Call segments may be identified based on events that occur during the master call. The call data analysis applications may identify call events using the data queries and algorithms; events may include connecting parties, terminating calls, placing calls on hold, and other types of call events indicating that a call segment was instantiated or terminated.

Data Sources Feeding Datamart

The call system 300 may comprise any number of data sources, which may be hardware and software components that generate and/or store data of various types and formats. In some cases, data provided from a data source may be used by the Datamart 301 to identify member calls, call paths, and call segments, for which the Datamart 301 produces the corresponding database records, which are stored into a call path dataset 303 or call segment dataset 305. In some cases, the Datamart 301 may store data from a data source into call path records, call segment records, or other data records hosted by the Datamart 301. In these cases, the Datamart 301 may be configured to provide the stored data or data records to computing services of the system 300, such as an analytics application or an enterprise data warehouse (EDW) 223, when those computing services submit programmatic database queries to the Datamart 301. In other words, the Datamart 301 may be configured to generate data (e.g., call path datasets 303, call segment datasets 305) using the data received from the data sources, but the Datamart 301 may also be configured to host the data it receives or derives, for the benefit of components of the system 300 to query and analyze.

In some embodiments, data sources may provide functional utility supporting the call system 300 that may result in the production of call data. For example, an internal telephony system may host the enterprise portions of the telephone communication channel and provide call center features of call center technologies, such as call-routing and distribution, computer-telephony integration (CTI), and integrated contact management. This internal telephony system might produce call data in any number of formats, for any number of purposes (e.g., inter-application communication, data storage, data warehousing, event logging). In some embodiments, a data source may be a software application of the organization that produces data of any type, as a result of execution. For example, a software application data source may be an application that executes MSR analytics to produce data related to the effectiveness and efficiency of MSRs or MSR units.

Call Recording Data from Telephone System Voiceline

A Datamart 301 may receive call data from a call-recording database 309, which may be a database that stores call records containing information about member calls and, in some embodiments, multimedia recordings of member calls. The call-recording database 309 may be hosted on one or more computing devices in networked-communication with the Datamart, such as the computing devices of a service center or other computing devices of an enterprise that are in networked-communication with the servers hosting the Datamart 301. Servers hosting the call-recording database 309 may be any computing device comprising non-transitory machine-readable storage media that stores call data produced by the hardware and software components of the telephone system, and a processor that is capable of executing the various tasks and processes of the call-routing database 309 described herein. In some embodiments, the call-recording database 309 may be associated with an internal telephony system that manages call routing and distribution for service centers of the organization's enterprise. In such embodiments, the call data in the call records may be generated as matter of ordinary operation of the internal telephony system's hardware and software components. As mentioned above, in some embodiments the call-recording database 309 may store multimedia recordings of member calls or one or more call segments of the member call. In some embodiments, a In some implementations, the Datamart 301 may query and analyze call records transmitted from the call-recording database 309 to identify indicators of member calls and call segments, and then generate a records of the corresponding call path dataset 303 and call segment dataset 305. In some implementations, the call-recording database 309 may be configured to perform the various queries and analysis for identifying indicators of members calls and call segments. The call-recording database 309 may also execute the software routines for generating call path data records and call segment data records, which the call-recording database 309 may transmit to the Datamart 301, to store the call path records and call segment records into the corresponding call path dataset 303 and call segment dataset 305.

In some cases, the Datamart 301 or other analytics server may review the call recording data source 309 to generate various reports or metrics related to the effectiveness or efficiency of the internal telephony system technology. The telephony system may be configured to generate data logs that contain call data having data related to the functioning of the hardware and software components of the internal telephony system, and then store these logs into a call-recording database 309 or provide them directly to the Datamart 301. In some implementations, the Datamart 301 may be configured to execute queries on the call-recording data 301 to generate reports exemplifying how well or poorly the various aspects of the telephone system are operating. In some implementations, an internal telephony system or related call-recording database 309 may be configured to provide event log data to the Datamart 301, as an event in the telephone system occurs. The Datamart 301 may be configured to generate and provide alerts, via one or more communication channels, to MSRs, members, or administrators, when the Datamart 301 receives or detects event logs in the Datamart 301 containing call data related to certain types of events. For example, the Datamart 301 may be configured to function as a component detection and failure notification system. In this example, the Datamart 301 may be configured to identify certain event types of data or keywords in the data, provided from the data sources providing call data.

Interactive Voice System Data Source

An internal telephony system of a call system 300 may comprise an interactive voice response (IVR) system 315. An IVR system 315 may comprise hardware and software components configured to automatically route member calls to MSRs using predetermined call-routing programmatic rules. The IVR system 215 may execute software applications that generate telephonic prompts that are presented to members' communications devices 319, which the member may have used to contact the call system 300. In some cases, the IVR system 315 may have a series of stored templates that are fetched from a database and presented as a menu of options from which the member may select. The IVR system 315 may execute software applications that reference pre-stored programmatic rules that inform the software applications how to route the call to the appropriate MSR or MSR unit, or how to formulate a subsequent submenu, based on the member's inputs received by the IVR system 315 from the member's communication device 319. The IVR system 315 may capture call data about the member call and/or information about the member, which the IVR system 315 may store into a database or transmit to the Datamart 301. In some embodiments, the Datamart 301, devices of the service center, or devices of the telephony system, may execute software applications that perform statistical analysis on the call data produced by the IVR system 315. The Datamart 301 may be programmatically configured to analyze the various types of data (e.g., call data, member information data, MSR data, statistical analysis data) that are produced or stored by the data sources, and identify indicators of member call paths and call path segments.

As an example, a member may initiate a member call using a member telephone 319, which may be any hardware device comprising hardware and software components that allow the member telephone 319 to communicate with an organization's service center using telecommunications protocols and technologies. Non-limiting examples of a member telephone 319 may include a conventional wired telephone, cellular phone, smartphone, VoIP telephone, and softphone executed by a computing device, among others. A public telecommunications network may route the member call to the organization's internal telephony system, which may route the call to a voiceline (e.g., MSR telephone) or IVR system 315. In some cases, when the member call is routed to the IVR system 315, the internal telephony system may generate call logs containing call data related to the member call, such as the time of the member call, where the member call was routed, and a phone number of the member telephone 315. In some implementations, this call data could be used by the Datamart 301 as indicators of a member call. After routing the member call to the IVR system 315, the IVR system 315 may then present the member with a menu prompting the member to input a selection, which may be accomplished by voice, button actuation, or some other gesture by the member. Based on the member selection, the IVR system 315 may determine whether to route the call to a MSR or MSR unit, or whether to present a subsequent submenu to the member telephone 319. In some cases, the IVR system 315 may be preprogrammed to execute a decision engine, which makes the determinations in accordance with pre-configured programmatic rules. In some implementations, the IVR system 315 may be configured to generate logs containing call data that indicate, for example, which menus were presented to the member (e.g., menu ID), the member's input selections, which programmatic rules were applied, the determinations made (based on the programmatic rules), and where the IVR system 315 routed the member call. This call data, resulting from the member's interactions with the menus, may be provided to the Datamart 301 and used to generate call path records and call segment records.

In some embodiments, the IVR system 315 may be configured to authenticate members when the member call is received and routed to a service center. The IVR system 315 may fetch a special authentication menu template from a menu template database of the IVR system 315, and then provide the member telephone 319 with any number authentication challenges, according to the programmatic rules of the authentication menu template. The IVR system 315 may communicate the authentication inputs with a server, such as an authentication server or Active Directory® server, comprising hardware and software tools configured to authenticate members and other users of enterprise resources, computing services, and hardware and software components. An authentication server may determine whether the authentication inputs, which purportedly authenticate a member, match a set of credentials stored in the authentication server or other server (e.g., member database). The IVR system 315 may generate data logs based on the success or failure of the authentication sequence. These authentication data logs may contain call data related to the member call, such as the challenge questions provided to member, the forms of data the member provided to be authenticated (e.g., member ID, social security number, home address, mother's maiden name), and the success rate of the member or purported member.

Member and Marketing Data

Member and marketing data sources 311 may be software applications and databases that generate and store information about a relationship with a member, which may include member data, services activity, products, and which services or products are involved with a members, and marketing information. Non-limiting examples may include member databases, MSR and MSR unit data, MSR telephony routing data, service activity, product data, outbound marketing call data, referrals database (e.g., IBM Unica®).

Member Service Representative Data

Member service representative (MSR) data sources 313 may be software applications and databases that generate and store information about MSRs. Non-limiting examples of MSR data sources 313 may include MSR unit data, performance metrics, directory information for routing calls, service activity, MSR demonstrations, transfer details, acquisition activity, and referrals.

Member Contact and Call Activity Data

Member Contact and Call Activity 317 data sources may be any software applications and databases that provide the Datamart 301 with data records related to specific member calls. Member Contact and Call Activity 317 data sources 317 may be a variety of types of data, generated from any number of individual data sources that output data related to the sales efforts or service provided by the organization. Non-limiting examples of Member Contact and Call Activity 317 data sources may include: member disposition data, click trail data captured through a network communication channel (i.e., web history data), member disposition data, a product or service database, or a customer relationship management (CRM) application used by MSRs to manage requests and relationships (e.g., Aceyus, Interactive Intelligence® Customer Interaction Center™). The Member Contact and Call Activity 317 data sources may be hosted on any number of server devices comprising a processor that executes a corresponding software application. In some cases, Member Contact and Call Activity 317 data sources may also include databases configured to store outputted data from the corresponding software applications.

Member disposition data may indicate the member's disposition a the various stages of the member. Algorithms of the software may compare the member's voice pattern against model voice patterns, to determine how the member is reacting to the service that he or she is receiving. Member disposition software may be configured to execute during call segments and provide the member disposition data to an MSR, through an MSR service application, during a call segment associated with the MSR. In some cases, the member disposition data may be generated and provided to the Datamart 301 at regular intervals. The member disposition software may be configured to "listen" to ongoing member calls (i.e., receive a multimedia stream or recording), and compare the voice patterns of the member against predetermine voice patterns indicating human moods or emotions. In some embodiments, the disposition data may be generated by automatically generating and analyzing transcription data of the member call, and analyzing the word choice of the member and MSR. Additionally or alternatively, the member distribution data may indicate how the member responds to call segments, independent of the member's mood or emotion, such as whether the member elected to accept a product offer. In some embodiments, this data may be used by the Datamart to identify, for the member or a classification of members, which terms and techniques may be most effective in satisfying member needs or offering members' products. For example, after identifying call segments and generating call segment data records for a member call, the Datamart may determine that certain phrases or words used to offer a product a member were effective in both causing the member to accept the offer, but also pleasing the member, suggesting that the member would accept similar offers if presented using the same terms or techniques. This derived data may be provided to other systems in the system 300, such as an MSR database that is referenced by a call routing function of the internal telephony system.

Transfer Details Data

Transfer Details data sources 319 may be any hardware or software components that generate transfer details data, which may be call data that is generated by the components in response to the telephony system transferring (i.e., re-routing) the member call between points of contact (e.g., MSRs, IVR, receptionist). Non-limiting examples of Transfer Details data sources 319 may include: telecommunications switches and exchanges, telephony system logs, a call-database 309, MSR Data 313 associated with MSR actions, and an IVR system 315 log, among other devices and applications. The Transfer Details data sources 319 may transmit the outputted transfer details data to the Datamart 301 at predetermined interval or in response to a triggering event, like Datamart 301 queries or at the time a member call is transferred. That is, in some embodiments, when a transfer is executed (i.e. routing the member call to a new point of contact) by components of the telephony system, the Transfer Detail data sources 319, such as a call-recording database 309, may automatically transmit, to the Datamart 301, data records containing transfer details data.

As mentioned, the Datamart 301 may execute various algorithms to query and analyze the transfer details data, in order to identify a master call path or call segments. In some cases, transfer details data may contain indicators that suggest or expressly indicate that certain events occurred at certain times during the member call (e.g., transfers, holds, warm transfers, connection terminations). Transfer details may be data of various types, as the Transfer Details data sources 319 and may vary. Non-limiting examples of data field or data types in the transfer details data, may include: which point of contact (e.g., IVR, receptionist, MSR) the member telephone 316 was previously connected; a type of transfer (e.g., warm transfer, hard transfer); a type of event associated with the transfer: and the time of the transfer. There may be additional or alternative data fields or data types within the transfer details data.

Exemplary Reports and Metrics

In some embodiments, computer devices of the call system 300 may execute a software application that queries the Datamart 301 and produces various reports. These reports may provide insight into certain technical aspects of the service center, and may also provide insight into personnel operations, member behavior and other types of knowledge that may be derived from the data stored in the Datamart 301. Datamart queries may provide insight into operations from various actors' perspectives, because at least some of the data of the Datamart 301 is stored in call path datasets 303 and call segment datasets 305. Below is a listing of exemplary reports that may be generated by the software applications generating reports.

Voiceline Total Calls.

This report provides the total volume of Voiceline calls by Final Disposition (ending status of the call) as well as the percentage distribution of calls across Final Dispositions.

Voiceline Initial Menu.

This report provides the percentage and volume of Voiceline Calls by the Initial Menu of the IVR. It also provides insight into how members identify themselves and authenticate in Voiceline.

Voiceline Average Duration.

This report provides the average call duration of Voiceline calls by Call Intent as indicated by the member selections into an IVR menu, and Final Disposition (ending status of the call), as well as the percent distribution of call durations.

Voiceline Transfer Call Reason.

This report provides details about calls that were transferred out of the Voiceline or IVR system to an MSR, and may include call data, transfer details data, and other marketing and sales data, such as the call type and product associated with the member service need (i.e., reason motiving the member call), which may be assigned and stored to the call path data record based on what is produced by the Voiceline or IVR.

Segment Volume Report.

This report provides an snapshot summary of Call Segment Volumes, by MSR Organization.

Transfer Scorecard.

This report provides an snapshot summary of Transfer Rate, which may be the transfer volume or percentage of member calls. In some cases, reviewers may have the ability to filter into specific data points impacting a member call, such as the reason for a call and MSR Peer group.

Call Transfer Heat Map.

This report provides an Enterprise look at Transfer Volume between two areas to find Hot Spots for further analysis and build a more focused question for analysis. Filters on specific call drivers are also available in this report.

Top Transfers.

This report will provide Transfer Volume between pairs of MSR units: transferors and transferees.

Master Call Activity.

This report provides the trend in the total volume of Master Calls with any product acquisition activity (quote start, quote complete, app start, or app complete). Each Master Call is counted only once, regardless of the depth or quantity of acquisition activity.

Master Call Depth.

This report provides the volume of Master Calls with specific acquisition activity (quote start, quote complete, app start, or app complete).

Periodic MSR Offers Report.

This report provides the number of offers presented and extended along with member dispositions (accept/maybe/decline). It also calculates the percentages of the presented offers extended to members and extended-offers accepted.

Offers Report by Learning Method.

This report summarizes offers based upon the inputs that the marketing and referral data source (e.g., IBM Unica®) used to generate an offer to be extended to a member.

Monthly Offers Report by MSR Organization.

This report provides the number of offers presented, extended, and accepted, according to MSR or MSR units. It also calculates the percentages of the presented offers extended and extended-offers accepted.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "processing" or "computing" or "calculating" or "determining" or "displaying" or "identifying" or "detecting" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments described above are intended to be exemplary. One skilled in the art recognizes that there are numerous alternative components and embodiments that may be substituted for or included in the particular examples described herein and such additions or substitutions still fall within the scope of the invention.

What is claimed is:

1. A computer-implemented method comprising:
    determining, by a computer, a request associated with a member call based on one or more inputs received by the computer during the member call;
    responsive to the determining the request, obtaining, by the computer, a plurality of performance scores for a plurality of representatives associated with the request, each of the plurality of performance scores based upon a length of a call segment and a customer satisfaction rating for the call segment, wherein the call segment is associated with one of the plurality of representatives;
    based on the plurality of performance scores, determining, by the computer, a one of the plurality of performance scores satisfying a threshold value and a representative of the plurality of representatives associated with the one of the plurality of performance scores; and
    responsive to the determining the one of the plurality of performance scores and the representative, routing, by the computer, the member call to a terminal of the representative.

2. The method of claim 1, wherein the request indicates a product or service.

3. The method of claim 1, wherein the determining the request comprises receiving the one or more inputs; and
    wherein the one or more inputs comprise a selection from a menu transmitted by the computer in response to the receiving the member call.

4. The method of claim 1, wherein the determining the request associated with the member call further comprises:
    receiving, by the computer, a menu selection identifying the request from a voice response system.

5. The method of claim 1, wherein the obtaining the plurality of performance scores for the plurality of representatives associated with the request comprises:
    transmitting, by the computer, to a representative directory database, a query requesting a set of one or more representatives assigned to a type of the request; and
    receiving, by the computer, from the representative directory database, the set of the one or more representatives, wherein the set comprises the plurality of representatives, and performance scores of the one or more representatives.

6. The method of claim 1, wherein the routing the member call to the terminal of the representative comprises:

identifying, by the computer, a routing address in a data record for the representative, the routing address indicating a telephone extension of a telephone of the representative and an IP address of the terminal of the representative, and using the routing address, routing the member call to the terminal of the representative.

7. The method of claim 1, further comprising generating, by the computer, a call record for the member call, the call record comprising data associated with the member call comprising an indicator of the call segment of the member call.

8. The method of claim 7, wherein the indicator of the call segment of the member call comprises timing data indicating an initiation time and a termination time of the call segment of the member call.

9. The method of claim 7, wherein the call record comprises a result of a customer satisfaction poll associated with the call segment of the member call.

10. The method of claim 7, wherein the generating the call record for the member call further comprises:

generating, by the computer, member disposition data of the segment based on a voice pattern of the segment and a model voice pattern; and based on the member disposition data, computing a satisfaction score for the representative.

11. The method of claim 1, further comprising:

responsive to the determining the request, obtaining, by the computer, a call activity record of a caller associated with the member call, wherein the call activity record comprises a plurality of call motivators of the caller;

based on the call activity record of the caller, computing a likelihood score for each of the plurality of call motivators of the caller, wherein each of the plurality of call motivators is associated with a good or a service; and based on the computing the likelihood score for the each of the plurality of call motivators of the caller, determining a highest likelihood score and one of the plurality of call motivators associated with the highest likelihood score; and wherein the plurality of representatives is associated with the good or the service associated with the one of the plurality of call motivators.

12. A computer-implemented method comprising:

receiving, by a computer, call data associated with a member call from a data source, wherein the member call comprises a call path comprising a plurality of call segments, wherein the call data comprises a length of the member call and a customer rating of the member call;

responsive to the receiving the call data associated with the member call, generating, by the computer, a call path record;

identifying, by the computer, a call segment of the call path associated with a representative and a length of the call segment based on the length of the member call;

responsive to identifying the call segment, generating, by the computer, a call segment record;

based on the length of the call segment, determining, by the computer, an efficiency score of the representative;

based at least on the efficiency score and the customer rating, determining, by the computer, a performance score of the representative;

based at least on the performance score of the representative, generating, by the computer, rules for routing a call to the representative; and transmitting, by the computer, the rules to a directory database associated with the computer.

13. The method of claim 12, wherein the data source comprises a telephone system log indicating a routing history of calls to the representative.

14. The method of claim 12, wherein the generating the call segment record comprises:

determining, by the computer, an initiation time of the call segment based on the length of the call segment and the length of the member call; and determining, by the computer, a termination time of the call segment based on the length of the call segment and the length of the member call; and wherein the call segment record is defined by the initiation time and the termination time.

15. The method of claim 12, wherein the generating the call segment record comprises:

identifying, by the computer, the representative associated with the call segment based on the call data from the data source.

16. The method of claim 12, wherein the determining the performance score of the representative further comprises querying, by the computer, a representative database for a record of the representative; and wherein the determining the performance score is further based on the record of the representative.

17. The method of claim 16, wherein the record of the representative comprises a frequency of sales of the representative; and wherein the determining the performance score is further based on the frequency of sales of the representative.

18. The method of claim 12, further comprising:

identifying, by the computer, a second call segment of the call path, different than the call segment associated with the representative and a length of the second call segment based on the length of the member call, wherein the second call segment is associated with a second representative;

responsive to identifying the second call segment, generating, by the computer, a second call segment record for the second call segment;

based on the length of the second call segment, determining, by the computer, a second representative efficiency score of the second representative;

based at least on the second representative efficiency score, determining, by the computer, a second representative performance score of the second representative;

based at least on the second representative performance score, updating, by the computer, the rules for routing the call to the representative; and transmitting, by the computer, the updated rules to the directory database associated with the computer.

19. The method of claim 12, further comprising:

receiving, by the computer, a score of the representative, the score different than the customer rating, the efficiency score, and the performance score; and responsive to the receiving the score, updating the rules for routing the call to the representative based at least on the score.

* * * * *